UNITED STATES PATENT OFFICE.

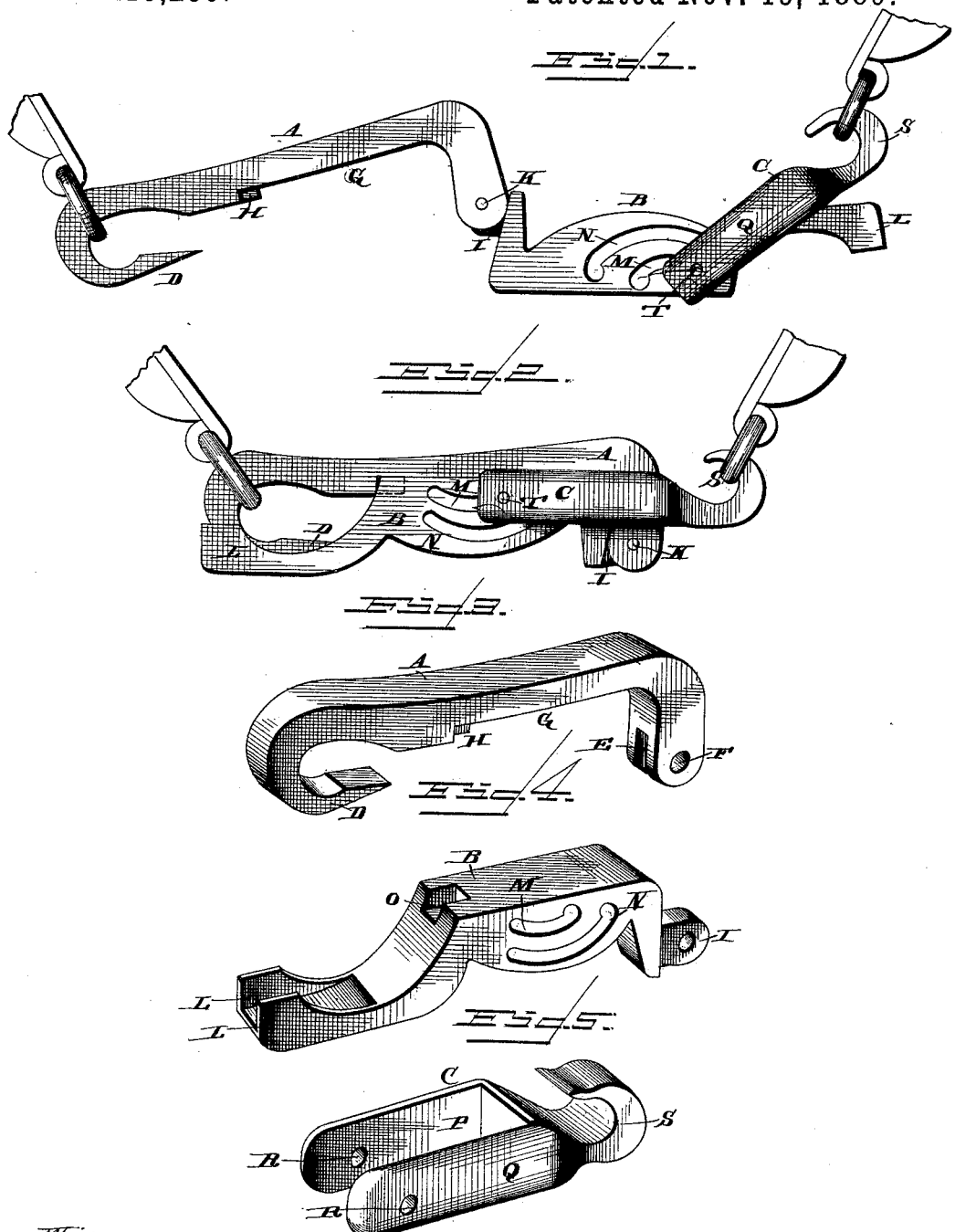

ELI C. VALE, OF EAST CARMEL, OHIO.

HAME-FASTENER.

SPECIFICATION forming part of Letters Patent No. 415,259, dated November 19, 1889.

Application filed March 8, 1889. Serial No. 302,475. (No model.)

*To all whom it may concern:*

Be it known that I, ELI C. VALE, a citizen of the United States, residing at East Carmel, in the county of Columbiana and State of Ohio, have invented certain new and useful Improvements in Hame-Fasteners; and I do hereby declare the following to be a full, clear, and exact description of the invention, such as will enable others skilled in the art to which it appertains to make and use the same.

My invention relates to hame-fasteners, and has for its object an improvement in self-locking adjustable fasteners adapted to unite the two hames of a set of harness and retain them firmly in their working position.

The invention will be hereinafter described, and particularly pointed out in the claims.

In the accompanying drawings, which form part of this specification, Figure 1 represents a side view of my improved hame-fastener thrown wide open; Fig. 2, the same closed and locked in position for use; Figs. 3, 4, and 5, detail perspective views showing the three component parts of the device.

Reference being had to the drawings and the letters thereon, A, B, and C represent the several parts of the fastener, which are preferably made of cast metal and in the peculiar form shown. One end of the portion A terminates in a hook D and the other in an L-shaped projection provided with a groove E, said projection being punctured by a rivet-hole F, running at right angles to the groove E and intended to receive a pin for securing the part A to the body portion B. On the inside surface of part A, and between said hook and projection, is formed a recess or seat G, at the hook end of which is a tooth H, projecting into said recess or seat to serve in locking the parts against lateral movement.

B indicates the body portion of the fastener, one end of which portion is also provided with an L-shaped projection terminating in a tongue I for engagement with the groove E in part A, and when thus placed in engagement is secured by a rivet K, Figs. 1 and 2, passing through groove E and tongue I. On the opposite end of the body portion B are formed two flanges L L, which close down over the hook D on part A, preventing any lateral movement of the same when in use, and between these parts L and I in the body portion B are cut one or more segment-shaped slots M N through the part B, to serve in securing the part C in place. About midway between the flanges L L and the opposite end of part B is cut a recess O, corresponding in size with the tooth H on part A, in connection with which it serves to lock parts A B, and, with the flanges L L, prevent lateral movement thereof.

Part C consists of two parallel sides P Q, punctured at their inner ends with bolt-holes R and provided at its outer end with a hook S.

The parts A, B, and C being formed substantially as shown and described, the construction and operation are as follows: Part A is secured to body portion B by means of a rivet K, passing through tongue I and groove E. Part C is then swiveled in one of the slots M N by means of a bolt T, passing through bolt-holes R in the sides P Q of part C and one of the transverse slots M or N. As shown in Fig. 1, hook S is now secured in the ring attached to one hame and hook D in that attached to the other. Part B is now used as a lever and forced back until the flanges L L thereon incase the hook D of part A, which movement has the effect of drawing the lower ends of the hames toward each other and holding them firmly to the collar, as shown in Fig. 2, by which figure it will be observed that when in use the line of draft is such that the greater the strain the less liable is the fastener to become accidentally detached. It will also be noticed that the slots M N shown admit of an adjustment of the parts to fit collars of different sizes.

Having thus described my invention, what I claim is—

1. In a hame-fastener, a main part A, having a hook at one end and an angular extension at the opposite end, and a body portion or lever B, having a corresponding extension at one end pivoted in the outer end of the extension on the part A and provided with a segmental slot or slots, and a recess or seat having side flanges at its free end to receive and inclose the hook D, in combination with a hook pivotally secured in the lever B, substantially as described.

2. A hame-fastener consisting of the parts

A and B, having angular extensions at one end thereof and pivotally joined at said extensions, a transverse slot or slots in the part B and having the flanges L L, and a hook C, pivotally secured in part B, substantially as described.

3. A hame-fastener consisting of a body portion or lever punctured by a segment-shaped slot or slots, and having an angular extension at one end thereof provided with a projecting tongue and having a recess in its upper surface, and a hook pivotally secured in said body or lever, in combination with a main hook corresponding in length with the lever and having an angular extension at one end provided with a slot to receive the tongue on the lever, and a tongue on its inner surface for engagement with the recess in the body portion, substantially as described.

In testimony whereof I affix my signature in presence of two witnesses.

ELI C. VALE.

Witnesses:
A. Y. TAYLOR,
W. A. FARR.